W. H. THOMPSON.
PNEUMATIC TIRE TUBE PROTECTOR.
APPLICATION FILED SEPT. 28, 1917.
1,294,573.
Patented Feb. 18, 1919.
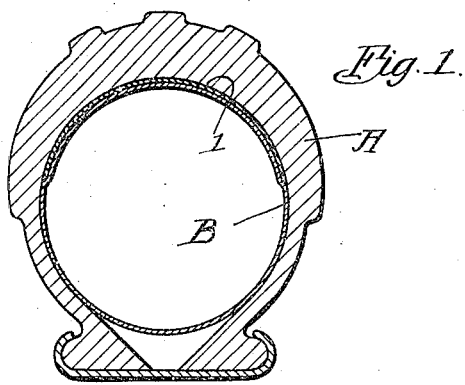
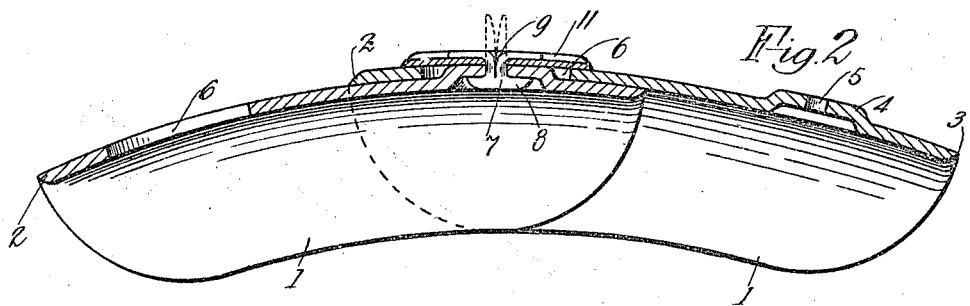
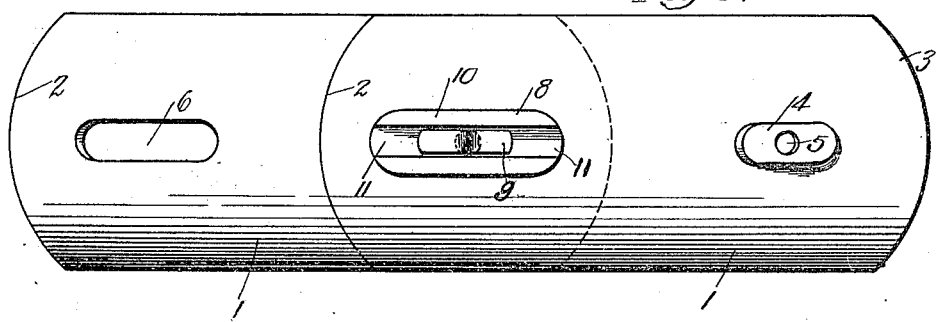
W. H. Thompson — Inventor.
By E. F. Bond
his atty.

UNITED STATES PATENT OFFICE.

WILLIAM H. THOMPSON, OF MARINETTE, WISCONSIN, ASSIGNOR OF ONE-THIRD TO BENJAMIN BRILL AND ONE-THIRD TO SIDNEY M. KOHN, BOTH OF GREEN BAY, WISCONSIN.

PNEUMATIC-TIRE-TUBE PROTECTOR.

1,294,573.  Specification of Letters Patent.  Patented Feb. 18, 1919.

Application filed September 28, 1917. Serial No. 193,710.

*To all whom it may concern:*

Be it known that I, WILLIAM H. THOMPSON, a citizen of the United States of America, residing at Marinette, in the county of Marinette and State of Wisconsin, have invented certain new and useful Improvements in Pneumatic-Tire-Tube Protectors, of which the following is a specification, reference being had therein to the accompanying drawing.

The invention relates to pneumatic tire tube protectors, and it is especially adapted to be used in connection with automobile tires where it is placed between the inner and outer casings of the tire.

It is an object of the invention to provide a protector intermediate the casings of the tire whereby blowouts are prevented, thus materially lengthening the life of tires.

A subsidary object consists in providing means for preventing puncture of the inner tube, such means consisting in the provision of a circumferential band or ring of metal capable of deflecting a pointed object entering through the outer casing and heading for the inner casing.

It is also an object of the invention to provide a protector made up of a plurality of sections which may be readily assembled or disassembled and which may be shortened or lengthened in accordance with the size of tire with which the protector is to be used.

A further object consists in providing a connection for the several sections of the protector whereby the latter are free to execute a circumferential movement relative to each other and thus permitting the tube to adapt itself to an inflated or deflated tire.

To the accomplishment of the foregoing objects and others that will become apparent as the description proceeds, the invention is predicated on the means hereinafter fully described and illustrated in the accompanying drawing, in which—

Figure 1 is a section through tire and tube equipped with the improved protector.

Fig. 2 is a longitudinal central section through two sections of the protector.

Fig. 3 is a top plan view of the parts shown in Fig. 2.

The protector is composed of a plurality of sections, generally designated by 1, and adapted to be secured to one another in overlapping relation, so that a ring or band is formed which is interposed between the outer casing A and the inner casing B, as indicated in Fig. 1. Each section 1 is of arcuate form adapted to conform to the contour of the casings and terminates in convex edges 2 and 3. Adjacent to one edge, the section 1 is provided with a protuberance 4 of oblong form which is apertured, as at 5, for the passage of a pin, as will be hereinafter fully explained. At the opposite end of the section, a slotted hole 6 is provided, the dimensions of which are sufficient to loosely receive the protuberance 4 of a coöperating section. As will be seen by reference to Fig. 2, the protuberance 4 normally is arranged centrally within the slotted opening 6 so that a sliding movement may take place between two sections, such as is necessary when the protector must be contracted after the tire has become deflated or when the protector is to be expanded when used with a tire of larger diameter. To secure two sections 1 of the protector, a pin 7 is provided, the head 8 of which is received in the hollow of the protuberance 4, and the solid stem 9 of which is split longitudinally, so that after introduction of the pin into the aperture 5 of the protuberance, the split portions of the stem are folded back to effect a permanent but loose connection between appertaining sections 1.

A washer 10 centrally grooved, as at 11, is provided at the outside of the protector and is of sufficient length to cover the opening 6 of the section 1, irrespective of whether the protuberance is in a central or end position within the slotted hole 6. The central groove 11 of the washer receives the end portions of the split stem of the pin whereby this washer is secured to the protuberance and overlaps the opening 6. The provision of the washer prevents the entrance of dirt or foreign substances into the opening 6 of the section, so that no deposits may aggregate therein and impede sliding movement of the section.

While the drawing shows the preferred embodiment of the invention, by way of example, various departures suggest themselves to those skilled in the art and it is therefore my intention not to confine myself to the details exactly as shown, but to avail myself of any changes which fairly fall within the scope of the invention as defined by the appended claims.

I claim:

1. In combination with the outer and inner casings of a tire, a protector comprising a plurality of sections arranged in overlapping relation, the end portion of one section loosely receiving within an elongated hole, a protuberance of an appertaining section, a washer arranged on said protuberance and covering the elongated hole of the appertaining section, and means for securing said washer to the protuberance.

2. In combination with the outer and inner casings of a pneumatic tire, a protector comprising a plurality of sections arranged in overlapping relation, the end portion of one section being provided with an elongated opening and receiving therein slidably the protuberance of an appertaining section, a washer on said protuberance and covering the elongated opening, said washer being formed with a central longitudinal groove and a pin securing said washer to said protuberance, the end portion of said pin being received within the central groove of said washer.

In testimony whereof I hereunto affix my signature.

WILLIAM H. THOMPSON.

Copies of this patent may be obtained for five cents each, by addressing the "Commissioner of Patents, Washington, D. C."